(12) United States Patent
Iliffe-Moon et al.

(10) Patent No.: US 11,707,971 B2
(45) Date of Patent: Jul. 25, 2023

(54) METHOD, APPARATUS, AND PROGRAM FOR DELIVERING A SCENT ALERT

(71) Applicant: Bayerische Motoren Werke Aktiengesellschaft, Munich (DE)

(72) Inventors: Etienne Iliffe-Moon, Menlo Park, CA (US); Brian Mok, Santa Clara, CA (US); Annabelle Coffinet, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/722,627

(22) Filed: Dec. 20, 2019

(65) Prior Publication Data
US 2021/0188049 A1 Jun. 24, 2021

(51) Int. Cl.
*B60H 3/00* (2006.01)
*B60Q 9/00* (2006.01)
*B60H 1/00* (2006.01)

(52) U.S. Cl.
CPC ....... *B60H 3/0035* (2013.01); *B60H 1/00742* (2013.01); *B60Q 9/00* (2013.01)

(58) Field of Classification Search
CPC .. B60H 3/0021; B60H 3/0028; B60H 3/0035; B60H 2003/0042; B60H 2003/005; B60H 2003/0064; B60H 1/00742; B60Q 9/00; B60Q 5/00; A61B 5/1114; A61B 5/18; A61M 1/00; A61M 21/02; B60W 40/08; B60W 50/14; G10L 15/22
USPC ..................................................... 340/439
See application file for complete search history.

(56) References Cited

U.S. PATENT DOCUMENTS

| 6,392,550 B1* | 5/2002 | Najor ........................ A61B 5/18 340/576 |
| 8,339,268 B2* | 12/2012 | Deng ..................... G08B 21/06 455/418 |
| 2003/0181822 A1* | 9/2003 | Victor ................... A61B 5/1114 600/558 |
| 2008/0006651 A1* | 1/2008 | Arakawa ................. G08B 5/40 222/52 |

(Continued)

FOREIGN PATENT DOCUMENTS

| EP | 1184083 A1 | 3/2002 |
| WO | 2018022562 A1 | 2/2018 |

(Continued)

OTHER PUBLICATIONS

Thomas A. Dingus et al., Driver Crash Risk Factors and Prevalence Evaluation Using Naturalistic Driving Data, Proceedings of the National Academy of Sciences, vol. 13, No. 10, pp. 2636-2641 (Mar. 8, 2016)).

*Primary Examiner* — Stephen R Burgdorf
(74) *Attorney, Agent, or Firm* — 2SPL Patent Attorneys PartG mbB; Kieran O'Leary

(57) ABSTRACT

Embodiments generally relate to a method, an apparatus, and a machine-readable medium for delivering an at least one alerting scent to a cabin of a vehicle. In particular, embodiments relate to a method comprising obtaining information on an environment of the vehicle, determining an alert condition based on the information on the environment of the vehicle, and delivering the at least one alerting scent to the cabin of the vehicle based on the alert condition.

16 Claims, 5 Drawing Sheets

(56) References Cited

U.S. PATENT DOCUMENTS

| | | | |
|---|---|---|---|
| 2008/0180257 A1* | 7/2008 | Omi | B60W 50/14 |
| | | | 340/575 |
| 2008/0204256 A1* | 8/2008 | Omi | B60K 28/066 |
| | | | 340/575 |
| 2010/0202658 A1* | 8/2010 | Ishida | B60N 2/5657 |
| | | | 382/103 |
| 2014/0062704 A1* | 3/2014 | Kubotani | G08B 21/06 |
| | | | 340/575 |
| 2014/0125474 A1* | 5/2014 | Gunaratne | G08G 1/163 |
| | | | 340/439 |
| 2019/0129416 A1* | 5/2019 | Upmanue | B60W 50/14 |
| 2019/0283546 A1* | 9/2019 | Schlegelmilch | B60H 1/00742 |
| 2021/0213237 A1* | 7/2021 | Keisen | B60H 1/00742 |

FOREIGN PATENT DOCUMENTS

| | | |
|---|---|---|
| WO | 2019030771 A1 | 2/2019 |
| WO | 2019154328 A1 | 8/2019 |

* cited by examiner

METHOD, APPARATUS, AND PROGRAM FOR DELIVERING A SCENT ALERT

FIELD

Embodiments generally relate to a method, an apparatus, and a machine-readable medium for delivering an at least one alerting scent to a cabin of a vehicle. In particular, embodiments relate to a concept for delivering an alerting scent to a cabin of a vehicle.

BACKGROUND

The human body is affected by its sense of smell. Leveraging a person's sense of smell can cause both physiological and psychological effects. It can also affect the sensory system as a whole. A smell can alter a person's emotion, mood, memory, and perception. And, in turn, how a person perceives a smell can be influenced by the other senses in interesting ways.

Many industries, including the automotive industry, have only slowly incorporated a sense experience into their alert mechanisms. Common problems with scent dispensing apparatuses include the over delivery of scents, the delivery of singular scents, and the delivery of only a limited number of fragrances. Additionally, these dispensers, also known as air fresheners, are not designed for the automotive application. Hence, there may be a desire for an improved scent dispensing apparatus that can deliver a richer sensory experience.

SUMMARY

Embodiments generally relate to a method, an apparatus, and a machine-readable medium for delivering an at least one alerting scent to a cabin of a vehicle. According to an embodiment, a method for delivering an at least one alerting scent to a cabin of a vehicle comprises obtaining information on an environment of the vehicle. The method further comprises determining an alert condition based on the information on the environment of the vehicle and delivering the at least one alerting scent to the cabin of the vehicle based on the alert condition.

Important aspects about the delivery of scent alert include receiving information about a vehicle's environment, including the vehicle itself, its interior, passengers, exterior, journey information, and other conditions that may affect it. An alert condition may be any condition that meets a threshold for informing someone with an alerting scent. Determining an alert condition may be done by evaluating information for an alert condition and determining if that threshold is met. Selecting a scent may be part of determining an alert condition. For example, determining an alert condition could comprise evaluating a level of inattention of the driver. This could be done by evaluating the state of the driver compared to the state of the external environment or conditions. If it is determined that the driver is multi-tasking, distracted, experiencing mind-wandering, fatigued, drowsy, sleepy, etc. and this is incompatible with the state of the external environment and/or safety risk level. Then an alert condition may exist and a scent may be selected and delivered to counteract the observed state of the driver, such as delivering an invigorating or fresh scent to awaken a drowsy driver.

Delivering that scent to the cabin of a vehicle may be done alone or as part of a multi-sensory alert system. Scent alerts may be coordinated with other modalities. Due to the nature of scent molecules, a scent alert can be dispensed over time, reinforcing or augmenting other alert modalities (such as visual or auditory alarms). Or scent alerts could be dispensed based on priority with other alert modalities. For example, an alert condition involves a reported, upcoming traffic accident a lower priority alert, such as a scent alert, may be first issued and then a higher priority alert, such as an alarm, may be issued as the vehicle gets closer to the accident.

Delivering a scent alert might provide certain advantages over traditional alerts, namely the visual, auditory, and tactile senses that are commonly used for alerts. The olfactory system is distinct from all other senses and using scent or smell as a mode for alerting may provide advantages over traditional alerts. The sense of smell is an underused sensory modality, whilst the visual and auditory senses are often over-used or overloaded. Also, the visual sense has a high load on the human cognitive system and the auditory and visual senses can be both intrusive and obtrusive. A human's sense of smell can operate across cognitive boundaries, between a conscious and subconscious level. This means that you can receive information, through exposure to a scent, without actively being aware of it; for example, a scent if used at the right moment during an experience, can subconsciously center your attention and bring you back to the context of the current moment Often alerts that are delivered to our visual, auditory, and tactile senses are competing for the attention of the user against existing experiences with active sensory inputs across those modalities. Or these visual, auditory, and tactile alerts or "notifications" interrupt experiences that engage those same modalities. For example, driving a car through a complicated intersection may require a driver to actively observe and listen to the navigation system instructions. This can tax a driver's attention and cognitive capacity. If an alert about exceeding the speed limit, for example, was added through a visual or auditory warning, this would likely harm the driver's ability to safely drive, successfully navigate, and stay legally within the speed limit.

In this example, the use of a scent alert as a speed limit warning utilizes a different sensory modality to driving and navigating the car. Such that our sense of smell becomes a "background modality" for receiving a different priority sensory input (such as an alert) that is secondary to the core tasks of driving and navigating. By providing the speed limit alert via our sense of smell and not our eyes and ears, both the cognitive and sensory load on the driver is reduced. This may, in turn, reduce driver errors, confusion, and frustration.

Another example of an application of a scent alert may be as an early warning against "forgotten baby syndrome," where a young infant is accidentally left in a vehicle. A scent alert may act as a subconscious early warning for a parent that had a young infant in the rear seat. This may prod the parent's prospective memory by using a scent that is associated with the infant (or the parent is conditioned to) and releasing that scent at both the beginning and end of the journey. This may be combined with other alerting modalities, such as an immediate final warning such as an audible warning (e.g. car alarm) or visual warning (e.g. rolling down the windows).

Additionally, a scent alert system need not be presently active to deliver information. While an audio alarm must continue to emit sound and a warning light must remain lit to be effective and understood, a scent may be emitted once or periodically and use the properties of diffusion to alert an individual of a condition that may have passed. For example, if an auditory alarm is set to wake a sleeping child in a home it may be dismissed, potentially reflexively, by that child who then returns to sleep. However, a scent alert used as an alarm may not only rouse the child more pleasantly, engaging the subconscious rather than the conscious brain. It may also serve to alert others—like a parent—that an alarm has elapsed due to the persistence of the scent in the atmosphere. Therefore even if a scent alert is dismissed it may still impart information in ways not easily accomplished by other alert modalities. Thus a person need not be present at the time the scent alert is issued to receive the information that was issued. A scent alert may also give a person who was present at the time it was issued additional time to recognize and or register the alert, and then respond to it accordingly. Additionally, the decay of the smell over time as it diffuses into the atmosphere could imply or indicate to an individual how long ago a scent alert occurred.

The method might further comprise delivering the alerting scent to an at least one user of the vehicle. When a user is actively present in a vehicle, a scent alert may reduce the need for alerts that engage other senses or it may reduce the reaction time for a person to engage with a subsequent alert or alert condition, in affect preparing or priming the person to receive a subsequent alert (by any sensory modality). For example, a person traveling along a highway who is alerted by the scent that their exit is approaching might be more prepared, either consciously or subconsciously, to take the exit as it approaches or heed the audible and visual alerts of a global positing system (GPS) navigation device.

Further, an individual who is deaf, hard of hearing (mild or moderate hearing loss), color blind, blind, or otherwise impaired in a way that they cannot benefit from conventional alert systems might benefit from an olfactory alert system. This might be relevant to disabled users of self-driving modalities where the individual's direct control of the vehicle is not needed during routine operation but whose attention may be captured by smell when their assistance is needed. Such as when a self-driving vehicle breaks down and might need to signal to a disabled passenger to seek external assistance.

According to another embodiment, the information on the environment of the vehicle comprises information on an at least one sign of inattentiveness of the at least one user. Inattentive driving is generally the failure to pay proper attention to the road while driving. Using a scent alert might be useful for keeping or focusing the attention of a driver of a vehicle, or alerting a passenger of a vehicle of the driver's inattentiveness. Keeping or centering the attention of a user involves using the scent to bring the user mentally into the present moment (e.g. to counteract distraction and mind-wandering). A scent alert might be used when signs of inattentiveness are not severe and it is desired to subconsciously increase the driver's awareness of the environment of a vehicle without surprising them. A driver need not display complete inattentiveness for a scent alert to be prudent. A scent alert might be a gentle reminder to the driver to pay more attention, or it might actively increase a driver's attention by using scents known to address physical or psychological states, such as to thwart drowsiness and energize the driver or their passengers.

The signs of inattentiveness may comprise at least one element of the group of: a visual distraction of the at least one user from a road, a removal of at least one of the user's hands from a control device, a use of an electronic device by the at least one user, an alteration of the vehicle's travel path, a fatigue level of the at least one user, or a number of users of the vehicle. Signs of inattentiveness might include, among others, talking, eating, shaving, applying makeup, and attending to children or other passengers. Using cell phones and other wireless or electronic units might also be considered distractions. Signs of inattentiveness can also be when a user is engaged or focused in an activity or multiple activities other than driving, or multi-tasking whilst driving (working on and switching between multiple activities). The use of a scent alert may be beneficial to subtly remind a driver of their need to be attentive without resorting to a potentially harsh visual, auditory, or tactile alert. Further, a scent alert has the benefit of providing a preliminary or early alert or warning modality or mechanism that does not significantly increase the user's sensory or cognitive load. This is unlike a visual or auditory notification that requires attention, comprehension, and potentially a response.

Determining signs of inattentiveness may be done by vehicle sensors and a computer. For example, determining a visual distraction of the at least one user from a road may be accomplished through eye-tracking sensors. Likewise, steering wheel (or other control device sensors may detect the removal of at least one of the user's hands. Use of an electronic device by the at least one user may be determined either using sensors observing the use or through the devices connection to a vehicle's infotainment system (e.g. if a user playing music through a car's stereo through Bluetooth and repeatedly switching or skipping songs it may be determined that they are being inattentive). An alteration of the vehicle's travel path may be determined by a lane departure system or GPS tracking. A fatigue level of the at least one user can mean any level of tiredness, weariness, drowsiness, sleepiness, or exhaustion resulting from mental or physical exertion or illness. A fatigue level may be calculated using factors like travel time, time of day, calendar events, or location tracking (e.g. assuming fatigue if a user begins their journey after a flight or leaving a concert venue). A number of users of the vehicle may be determined by weight sensors in the seats, the number of devices connected to a vehicle's infotainment (or wireless connectivity such as Bluetooth or WIFI) systems, or other sensors inside a cabin.

Signs of inattentiveness may also be programmatically determined. For example, an optical sensor may observe a driver of a vehicle while also monitoring the vehicle's course and other characteristics. If a vehicle uncharacteristically diverts from its lane or travel path and this can be linked to a certain action performed by the driver a system may determine that action—or series of actions—is a sign of inattentiveness even if it would not be considered so for other drivers. For example, if a driver is observed eating and drinking, or resting their elbow on a windowsill and the vehicle soon after displays signs of an inattentive driver, that action may be determined to be a sign of inattentiveness whereas it may not for other drivers.

An additional embodiment might include determining the alert condition further comprising evaluating information on a level of attentiveness of the at least one user. The presence of a sign of inattentiveness, alone or in combination, might not constitute inattentiveness or inattentiveness severe enough to warrant an alert. Therefore determining a level of inattentiveness by evaluating information might increase the effectiveness of the scent alert by only alerting the olfactory system of the user when a user is evaluated to be inattentive at a sufficient level.

The method of delivering the at least one alerting scent might further comprise altering the delivering of the at least one alerting scent based on the information on the level of attentiveness of the at least one user. If a scent delivered to a driver is not sufficient to return that driver to a safe level of attentiveness altering the delivery of the scent might be prudent to accomplish the desired effect. Altering a scent from pleasant to disgusting or invigorating, or from light intensity to strong intensity might inspire the same reaction in the driver and prompt increased alertness.

Altering the delivering of the at least one alerting scent might comprise at least one element of the group of: augmenting the at least one alerting scent with an at least one additional scent, switching to the at least one additional scent, modifying an intensity of the at least one alerting scent or the at least one additional scent, or adjusting a climate in the cabin of the vehicle (e.g. reducing the temperature, increasing airflow and introducing fresh air, which also reduces carbon dioxide build-up and is associated with drowsiness and fatigue).

Embodiments might further include a method wherein the information on the environment of the vehicle comprises at least one element of the group of: weather, traffic, news, location, or time-based information. By including external information sources a scent alert might be able to subtly alert a user of a vehicle of non-critical information, such as a change in weather (such as affecting driver visibility or driving conditions), increase in fatigue, or an alarm based on the current time or journey time. This delivers information in a way that doesn't increase a driver's level of attentiveness through auditory or visual distractions.

An embodiment might actively monitor both information on the environment of a vehicle—including the vehicle's external sensor data or data on traffic, road conditions, hazards, etc. —to assess the level of risk relative to the level of attention of a user and respond accordingly. In other words, the embodiment monitors both driver's inattention and external conditions that require driver attention, weighing the two to decide if delivering an alerting scent is required. It is perhaps most appropriate for autonomous vehicles of levels 2, 3 and possibly 4. The external sensor data could also be cloud based or connected and shared by other vehicles to optimize and enhance the system.

Determining an alert condition may further comprise calculating a required level of attention of the at least one user, and adjudicating whether the information on a level of attentiveness of the at least one user meets the required level of attention. By calculating or predicting a required level of attention based on a user's history, road conditions, weather, traffic, or other data an alert condition may be better tailored to the user and the real-time driving experience. A sign of inattention that may not normally trigger an alert condition or that may not trigger an alert condition for most users may trigger depending on changing circumstances in the vehicle's environment or based on a user's history navigating that environment. This creates a better alerting experience by reducing the need for unnecessary alerts or identifying conditions that may make a safer driving experience by providing an alert.

An alerting scent may further comprise at least one element of the group of: a citrus, a mint, a rosemary, a coffee, or a eucalyptus scent. Using scents that are known to increase attentiveness and invigorate or excite a user may be more likely to keep the user attentive without resorting to more drastic methods of alerting the driver and produce a safer journey.

Embodiments might further comprise delivering an at least one additional alert, wherein the at least one additional alert comprises at least one element of the group of: a physical alert, an auditory alert, or a visual alert. Alerting scents may be delivered as part of an alert strategy that engages different sensory modalities based on urgency (i.e. temporal) or criticality (i.e. importance). If a scent alert is not sufficient to return a user to a safe state of attentiveness or otherwise alert a user it might be helpful to trigger another sensory alert experience. For example, a scent alert can be used as an early warning of surpassing the speed limit (e.g. by 10% or 5 mph), an approaching hazard, or autonomous driving takeover event. After a scent alert is delivered, primary alerts may be engaged through visual and audible warnings when the situation becomes more critical. Autonomous driving takeover events may depend on the automation level of the car as specified by SAE International's SAE J3016, which classifies autonomous driving systems for vehicles.

Additionally, a multi-sensory alert (combining olfactory, physical, tactile, auditory or visual modalities) might be a simultaneous alert using multiple modalities simultaneously, staggered, or in a time-based sequence or rhythm.

The method might be performed by an apparatus for delivering an at least one alerting scent to a cabin of a vehicle, the apparatus comprising a processor configured to obtain information on an environment of the vehicle. The processor also configured to determine an alert condition based on the information on the environment of the vehicle. The processor further configured to deliver the at least one alerting scent to the cabin of the vehicle based on the alert condition. Using an apparatus to perform the method allows for the scent alert to be performed in vehicles that are not equipped to perform the method with their standard onboard systems.

Further, the method might be stored on a non-transitory machine-readable medium storing instructions that, when executed by a computer, cause the delivery of an at least one alerting scent to a cabin of a vehicle. The alert scent delivery process comprising obtaining information on an environment of the vehicle, determining an alert condition based on the information on the environment of the vehicle; and delivering the at least one alerting scent to the cabin of the vehicle based on the alert condition. Using a non-transitory machine-readable medium allows the scent alert to be performed on computer-controlled fragrance systems. This means that the scent alert can be added to systems with an update to systems that previously could not perform the method.

BRIEF DESCRIPTION OF THE DRAWINGS

Some embodiments of apparatuses and systems will be described in the following only by way of example and with reference to the accompanying figures, in which.

DETAILED DESCRIPTION

Various embodiments will now be described more fully with reference to the accompanying drawings in which some embodiments are illustrated. The thicknesses of lines, layers, and/or regions in the figures may be exaggerated for clarity.

Accordingly, while further embodiments are capable of various modifications and alternative forms, some particular embodiments thereof are shown in the figures and will subsequently be described in detail. However, this detailed description does not limit further embodiments to the particular forms described. Further embodiments may cover all modifications, equivalents, and alternatives falling within the scope of the disclosure. Same or like numbers refer to like or similar elements throughout the description of the figures, which may be implemented identically or in modified form when compared to one another while providing for the same or similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations (i.e. only A, only B, as well as A and B) if not explicitly or implicitly defined otherwise. An alternative wording for the same combinations is "at least one of A and B" or "A and/or B". The same applies, mutatis mutandis, for combinations of more than two elements.

The terminology used herein to describe particular embodiments is not intended to be limiting for further embodiments. Whenever a singular form such as "a," "an" and "the" is used, and using only a single element is neither explicitly nor implicitly defined as being mandatory, further embodiments may also use plural elements to implement the same functionality. Likewise, when functionality is subsequently described as being implemented using multiple elements, further embodiments may implement the same functionality using a single element or processing entity. It will be further understood that the terms "comprises," "comprising," "includes" and/or "including," when used specify the presence of the stated features, integers, steps, operations, processes, acts, elements, and/or components but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the embodiments belong.

Figure 1:
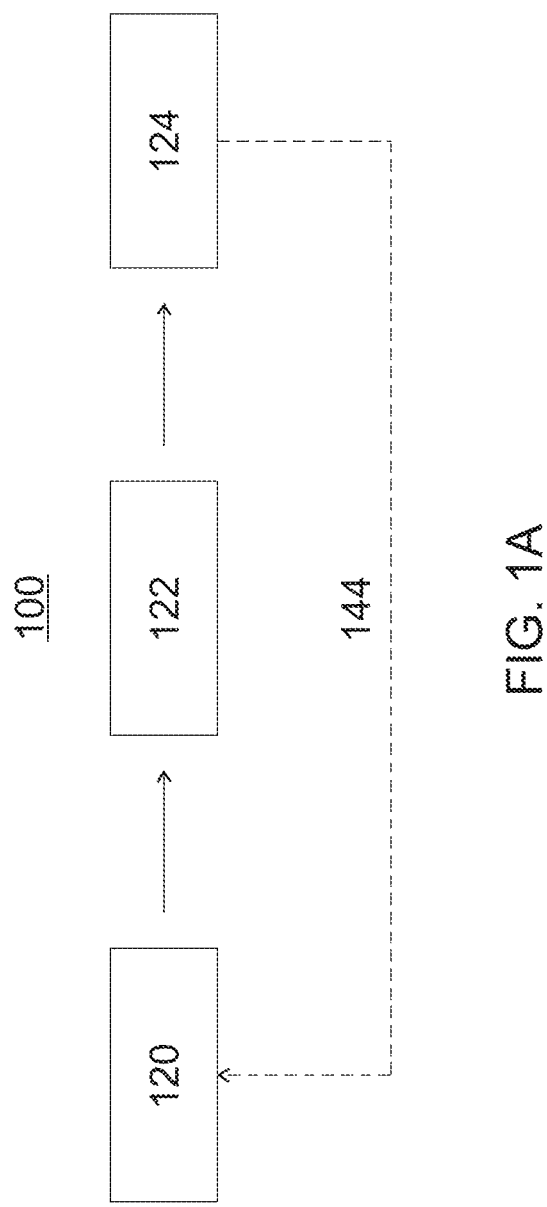
FIG. 1 shows a block diagram of an embodiment of a method for delivering an at least one alerting scent to a cabin of a vehicle.

FIG. 1 shows a block diagram of an embodiment of a method 100 for delivering an at least one alerting scent to a cabin of a vehicle. The method 100 comprises obtaining 120 information on an environment of the vehicle. The method 100 continues by determining 122 an alert condition based on the information on the environment of the vehicle. The method 100 then further comprises delivering 124 the at least one alerting scent to the cabin of the vehicle based on the alert condition. Information on the environment of a vehicle can be any information concerning the vehicle, including its condition, status, circumstances, surroundings, or journey. Information may be obtained on a user, the external environment, inside or outside the vehicle, from the vehicle systems, or data provided to the vehicle and/or users. An alert condition may be any condition that may trigger an alert or notification to be delivered to a user. An alert does not need to be urgent or have priority over other notifications. An alert is just something that is designed to capture or direct the consciousness of a user that may result in the user becoming aware of information and potentially to take action based on that information.

A vehicle may be any type of land-, sea-, and air-based vehicle or transportation system. An alert condition may be any condition that requires the attention of a user of the vehicle. For example, an alert condition could include the passage of a certain amount of time since the vehicle's operation began, the impending approach of a waypoint on the vehicle's journey, the need to switch from autonomous driving to manual based on changing traffic, navigation, or weather conditions. Delivering 124 the at least one alerting scent can be done through any apparatus that employs this method. The delivery can be done using an integrated, onboard fragrance system included in the vehicle or by an independent system located within the vehicle's cabin. Additionally, the method is vehicle independent and may be deployed in environments and systems not used or designed for transportation, such as in a home, a retail environment, public spaces, an office or any of the climate systems that operate in those spaces.

The alerting scent may be delivered to an at least one user of the vehicle. The user of the vehicle may be the driver, a passenger, or another occupant of the vehicle. For example, in a fully autonomous vehicle, an alerting scent may be delivered to one or more passengers alerting them to be prepared to take control of a vehicle. An alerting scent may be delivered to a user who might not be authorized to use the vehicle. The alerting scent may be designed to deliver a warning, such as an unpleasant scent, to an unauthorized user of a vehicle letting them know that their unauthorized use was detected. An unpleasant alerting scent may also be used to encourage temporary users of a vehicle, such as a valet, not to linger in the vehicle longer than necessary. Additionally, the user, or intended recipient of the alerting scent, might not be human. A calming or familiar scent may be delivered to an anxious canine awaiting their owner's return to a parked vehicle.

Information on the environment of the vehicle may comprise information on an at least one sign of inattentiveness of the at least one user. Information on a sign of inattentiveness may be obtained from the use of onboard cameras—particularly those for eye-detection—steering wheel sensors, lane departure systems, interior microphones, algorithms to determine fatigue, or other systems. For example, if a user is driving the vehicle and their eyes are not focused on the road or they are engaging in prolonged conversations with their passengers, those may be considered signs of inattentiveness. Additionally, an algorithm, such as one that determines fatigue based on driving time and difficulty, may be used to determine that a user driving the vehicle is likely to be inattentive.

If information on multiple signs of inattentiveness is gathered, then the type of information gathered may have relevance to how the alerting scent is delivered and which scent profiles should be engaged. Additionally, this information could be used to determine if other sensory modalities should be used to support the alerting scent, including how the sensory modalities are related, coordinated or synchronized.

At least one sign of inattentiveness comprises at least one element of the group of: a visual distraction of the at least one user from a road, a removal of at least one of the user's hands from a control device, a use of an electronic device by the at least one user, an alteration of the vehicle's travel path, a fatigue level of the at least one user, or a number of users of the vehicle. Visual distraction includes the detection of a user's eyes as not focused on the lane of travel. Visual distraction might not be a prolonged departure of a user's eyes from the road but may include rapid eye movements away from the road or an increased rate of eye movement away from the road indicating increasing distraction. Fatigue level may include signs of sleeping, such as prolonged closure of the eyes or a hypnic jerk, which is the brief and sudden involuntary contraction of the muscles of the body which occurs when a person is beginning to fall asleep. Fatigue may be registered by other gestures that indicate tiredness such as propping up one's head or resting it against a headrest or car pillar. Additionally, fatigue may be calculated algorithmically using factors such as length of the journey, number of stops, time of day, schedule (e.g. if the journey is occurring after a user has returned from an international flight) and other factors. Other potential signs of inattentiveness may include conditions such as boredom, mind-wandering, eating or drinking, multi-tasking, or preoccupation with other physical or mental tasks or activities. Boredom may be determined by the number of times a user has repeatedly taken an exact journey, meaning the sights and experiences of the journey are not novel to them and are more likely to fatigue them. Boredom or fatigue may also be determined by a drop off of activity in the car. For example, if a level of conversation between a driver and their passengers decreases over the course of a journey.

Determining the alert condition may further comprise evaluating information on a level of attentiveness of the at least one user. Users may have different levels of attentiveness. For example, as described above, a user driving on a lengthy trip home may have recently taken an international flight meaning that a threshold for determining an alert condition may be lower for that user than for an identical user, expressing identical mannerisms, on an identical journey but who did not take a flight immediately before their operation of the vehicle.

Delivering the at least one alerting scent may further comprise altering the delivering of the at least one alerting scent based on the information on the level of alertness of the at least one user. Altering the delivering of the at least one scent may include the timing of the scent delivery, the type of scent delivered, Altered delivery of a scent alert may include adding other multi-sensory/multi-modal alert systems. This may include delivering 124 a scent while also adjusting illumination or lighting, cabin features, and configuration (e.g. such as steering wheel or seating position, orientation, etc.). For example, if an autonomous vehicle is returning to manual or piloted mode, adjusting the seat or steering wheel into a position more functional for driving could alert the user that the time to take over the controls is approaching.

An alerting scent may be released in coordination with a visual or auditory alert, either simultaneously or controlled over time (e.g. cascading) depending on the status of the alert or a feedback loop from the system based on the obtained information.

FIG. 1 further shows the method 100 comprising an optional feedback loop 144, wherein after delivering 124 an alerting scent to the cabin of the vehicle, obtaining 120 information on the environment of the vehicle includes information previously obtained by an execution of the method 100. Therefore determining 122 an alert condition based on the information on the environment of the vehicle includes both new and previously known information. This allows for the alerting scent to be adjusted based on feedback obtained from previous executions of the method 100.

Altering the delivering 124 of the at least one alerting scent may comprise at least one element of the group of: augmenting the at least one alerting scent with an at least one additional scent, switching to the at least one additional scent, modifying an intensity of the at least one alerting scent or the at least one additional scent, or adjusting a climate in the cabin of the vehicle. For example, if the driver is drowsy and showing signs of sleepiness, adjusting the climate of the cabin of the vehicle could mean that a scent alert is delivered along with engaging the climate control system (e.g. to lower the temperature, increase the airflow to the face), opening or closing the windows, or increasing the lighting brightness.

Information on the environment of the vehicle may comprise at least one element of the group of: weather, traffic, news, location, road, or time-based information. The method may control one or more elements of the group of a navigation or traffic component, an infotainment component, weather information, safety monitoring component, and an autonomous driving system component. This allows for the method 100 to be integrated with other external systems that can adjust and inform the perception of the smell released by the cartridge. For instance, using weather information could allow the system to attune the alerting scent based on humidity, temperature, or other aspects of the weather. Also, using infotainment could allow the scent dispersal to be adjusted to coincide with other sensory effects, such as music or video, heightening the users' perception of a scent. The alerting scent can be coordinated, synchronized or curated with other experiences, happening inside or outside of the vehicle (e.g. lighting transitions, changes in the vehicle user interface, infotainment system, or vehicle systems). Alert conditions may be based on road conditions, regulations, or hazards (e.g. road intersections, stop signs, speed limit, school zones, potholes, etc.), as well as incoming or ongoing communication (e.g. phone calls, text or email messages, etc.).

The method may further comprise delivering an at least one additional alert, wherein the at least one additional alert comprises at least one element of the group of: a physical alert, an auditory alert, or a visual alert.

Determining an alert condition may further comprise calculating a required level of attention of the at least one user, and adjudicating whether the information on a level of attentiveness of the at least one user meets the required level of attention. Calculating or predicting a required level of attention that is required for the driver to drive safely may be accomplished by monitoring the environment of the vehicle (e.g. the exterior environment, conditions, traffic, road, etc.) and setting or reevaluating thresholds of attentiveness that may be acceptable in a user. The user's history may also be used to calculate a required level of attention. History may include demographics (e.g. age, gender, etc.), experience, abilities, training, or driving performance data. For example, if a user is driving down a road where they had trouble navigation in a previous encounter despite not triggering an alert condition. The threshold for the required level of attention may be increased or otherwise modified so that a user's level of attentiveness must also increase or be similarly modified.

Figure 4:
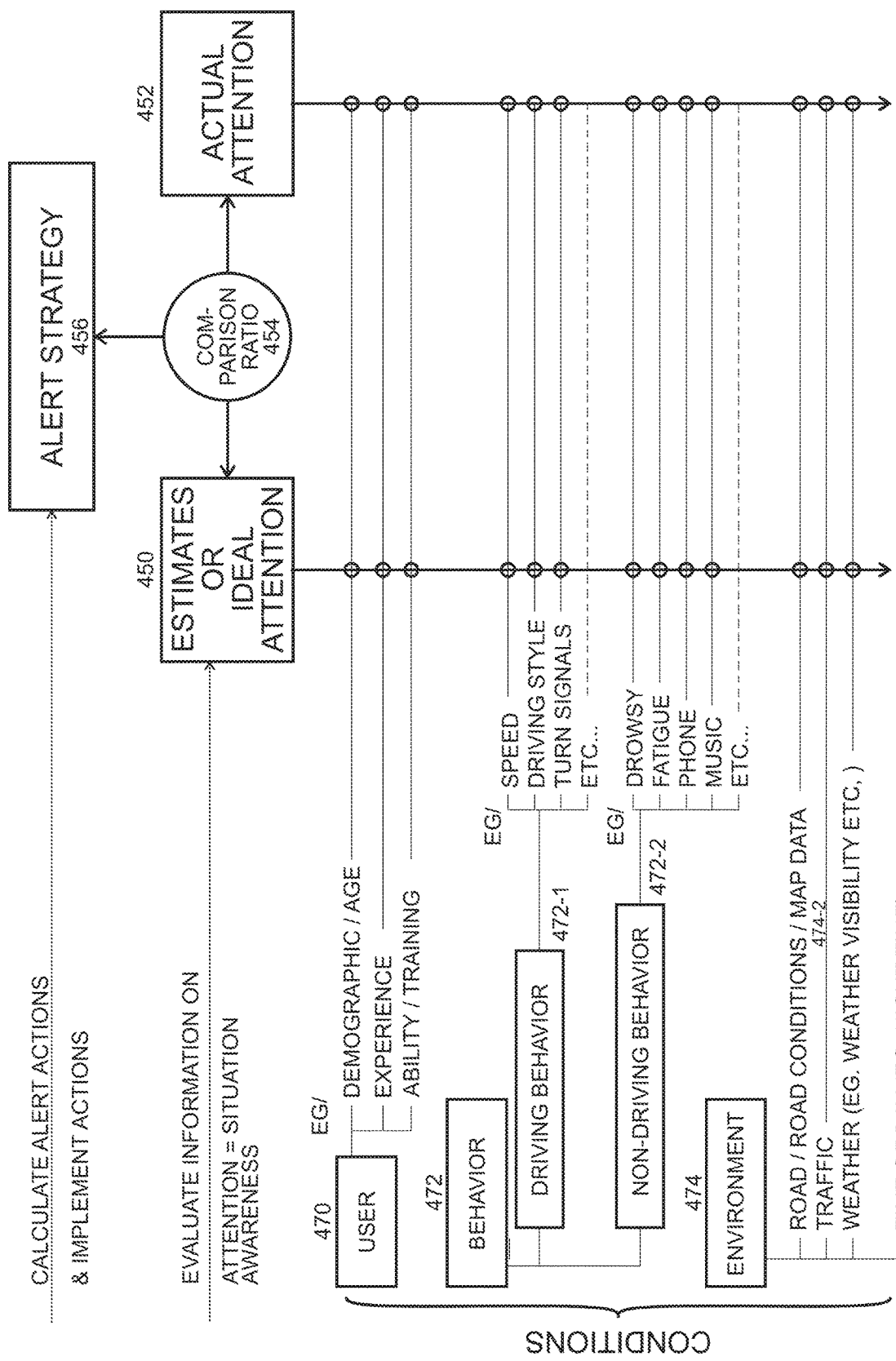
FIG. 4 shows a block diagram of an embodiment of a method for assessing safety risk.

FIG. 4 shows a block diagram of an embodiment of a method 400 for assessing safety risk. The method comprises estimating 450 a required level attention for safety from a user, determining 452 the level of attention of a user, and comparing 454 the estimated level to the determined level. The comparison 454 may change based on a selected alert strategy 456. A user's attention or inattention is the determined 452 using information gathered about the user's level of attentiveness. That is then compared 454 to the estimated 450 required level of attention.

Comparing 454 the estimated and determined level of attention may involve setting a threshold or score of attention estimated based on the environment of the vehicle. And the comparing whether the determined 452 level of attention exceeds the threshold of the estimated 450 level of attention.

Different factors or conditions may be weighted differently based on different circumstances. For example, if road conditions are good and traffic is light a driver that exceeds the speed limit may not trigger a threshold. Likewise, the importance of the time of day may not increase until it is a local rush hour or it is very late. These factors could also be based on a driver's history, a driver with a safe driving record could be given a higher threshold than a driver with a poor one even if all other environmental conditions remain the same.

Estimating 450 attention, determining 452 actual attention, and comparing 454 the two based on an alert strategy 456 may be done according to several models. In a simplistic model embodiment, which assumes that the ideal attention (IA) required is 100%, the level of actual attention (AA) may be calculated using the following formula:

$$AA=100-(F_1C_1+F_2C_2+F_3C_3+\ldots F_nC_n)$$

In this formula, $F_n$ represents a weighting of the risk condition n based. This may be based on statistical data from published studies to understand the risk of certain conditions and weight them accordingly as a distraction factor that drives the level of driver's attention (e.g., Thomas A. Dingus et al., *Driver Crash Risk Factors and Prevalence Evaluation Using Naturalistic Driving Data*, Proceedings of the National Academy of Sciences, vol. 13, no. 10, pp. 2636-2641 (Mar. 8, 2016)). $C_n$, in this formula, represents the number of occurrences of n. This may be the number of occurrences over a specified time period (e.g. within the last hour) or some other period, such as distance (e.g. since the beginning of a challenging stretch of roadway) or after the commencing of an event (e.g. the beginning of a weather event).

The alert strategy 456 is scaled according to the magnitude of AA relative to a period (e.g. 5 minutes). For example, if:

AA≥100. No action is taken.
85<AA<100. A scent alert is delivered in a time relationship to the event.
75<AA<85. A scent alert and an at least one additional alert is delivered in a time relationship to the event.

An extended model embodiment may look at factoring the conditions that might correspond to a different required level of attention. The extended model may be based on leveraging statistical studies to determine a nominal or typical attention level for statistically safe driving and adjusting that nominal or typical value for various distraction modes or states and environmental conditions or external factors. In the extended model a comparison ratio (CR) is calculated using the following formula:

$$CR = \frac{AA}{IA}$$

AA is calculated similarly to the simplistic model where:

$$AA=100-(F_1C_1+F_2C_2+F_3C_3+\ldots F_nC_n)$$

And IA is calculated using the formula:

$$IA=TAR+(F_1C_1+F_2C_2+F_3C_3+\ldots F_nC_n)$$

In this formula, TAR represents the typical attention ratio (TAR) and it is calculated from statistical data. In both of the above formulas, $F_n$ represents a weighting of the risk condition n based on a statistical findings and $C_n$ represents the number of occurrences of n.

The extended model assumes some level of risk, where that risk is calculated from statistical data. The alert strategy is therefore scaled according to a comparison of actual (AA) and idea attention (IA) values. For example, if:

CA≥1. No action is taken.
8.5<AA<1. A scent alert is delivered in a time relationship to the event.
7.5<AA<8.5. A scent alert and an at least one additional alert is delivered in a time relationship to the event.

Factors for estimating 450 a user's level of required attention or determining 452 actual attention may be based on several conditions, generally relating to the user 470, behavior 742 or the user or vehicle, and the environment 474.

Examples of environment conditions may include: a layout of a road or route (this may be based on mapping information or real-time information gathered from onboard sensors), road conditions, traffic (e.g. this may be observed from onboard sensors or reported from a wireless information service), map data, the speed limit, the weather, the time of day, or other data. Determining 452 the level of attention of a user may be based on conditions including: user conditions 470 conditions comprising a user's demographics, age, experience, ability or training. Behavior 472 conditions may be distinguished between driving behavior 472-1 (e.g. a vehicle's speed, driving style, use of turn signals) and non-driving behavior (e.g. drowsiness, fatigue, and the occurrence of activities such as using the phone or listing to music).

The user's driving style 452-2 may be determined if the user drives above the speed limit, routinely departs the lanes, or takes curves at high speed may signal a lower level of attention. The speed of the vehicle 452-3 (e.g. if the vehicle is traveling at high speed or the vehicle is constantly adjusting speed on a flat stretch of road) may be directly measured from the vehicle and weighted based on conditions such as weather or traffic.

Some non-driving behavior 472-2 conditions, like drowsiness, may be determined by tracking a driver's eyes, whether they are focused on the road, and calculating the driver's attention ratio (which is the ratio of how long their eyes are focused on road over a time period). Activities that may also be non-driving behavior 472-2 characters include multi-tasking (e.g. if there are several activities occurring simultaneously in the vehicle, such as if the driver is playing music, has several passengers, and receiving navigation information) complexity of instructions for a user (e.g. if a user fails to follow navigation instructions), or other activities (e.g. adjusting a vehicle's infotainment, climate, or other functions).

The alerting scent may comprise at least one element of the group of: a citrus, a mint, a rosemary, a coffee, or a eucalyptus scent. A user may become conditioned or adapted to alerting scents so there may be a need to alternate different scents. Also, the type of scent used may not be of primary importance but the consistent use of a single scent may be important to condition the driver and build an association between a specific alert condition or driver state (e.g. inattention) and the type of alert, such that the driver understands the meaning of the alert. Conditioning a user to a scent may offer a new approach to using scent as an alerting mechanism because it does not rely on the existing unconscious or conscious conceptions of centering attention but allows new conceptions and relations to scent to be built.

Figure 5:
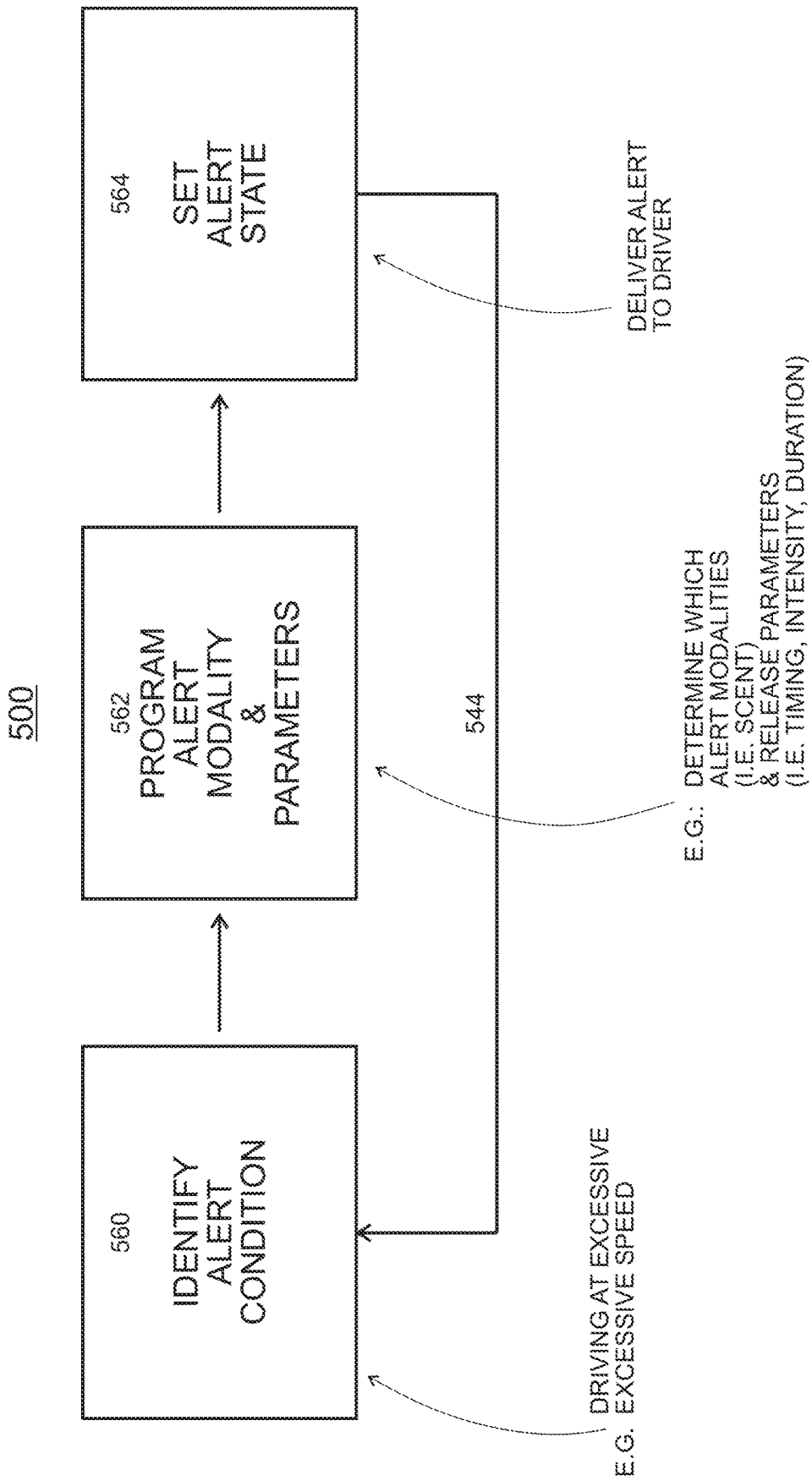
FIG. 5 shows a block diagram of an embodiment of a method for conditioning a user to an alerting scent.

FIG. 5 shows a block diagram of an embodiment of a method 500 for conditioning a user to an alerting scent. The method comprises identifying or determining 560 an alert condition, programming 562 an alert modality and parameters, and setting 564 an alert state. The method 500 further comprises a feedback loop 544, wherein after setting 564 and alert state the method 500 repeats and is adjusted to condition a user on associating an alert modality with an alert condition.

Identifying 560 an alert condition may be any condition that meets a threshold for informing someone with an alert modality. An alert modality can be any alerting mechanism—including a scent alert—that informs a user about or brings their attention to the alert condition. Programming 562 an alert modality and parameters means determining which alert modality or mechanism should be associated with the alert condition and adjusting the parameters of the alert modality. Setting 564 an alert state may mean delivering the alert to the user or the cabin of the vehicle. For example, if a scent alert modality is selected the parameters could include the timing, intensity, or duration of the alerting scent's release. The parameters may also include the type of alerting scent released. The alerting scent is then delivered to the cabin of the vehicle. Different alerting scents may represent different meanings to the user with how they are correlated or associated with a particular alert. However, it might not be important that a specific scent is delivered with a particular alert. An alerting scent in itself might indicate the need for alertness. For example, in the case where a user is drowsy and an alert condition is triggered or identified. The type of scent delivered to alert the driver might not be important. Or, if a previous alerting scent was delivered but has not altered the alert condition. A new scent may be delivered that may have a greater effect on the user.

The feedback loop 544 of the method 500 may include information on how the user perceived or reacted to the alert modality. This can be done by obtaining 120 information on the environment of the vehicle as in method 100. For example, if an alerting scent is determined to affect the driver the alert modality and parameters may include altering the parameters of the modality or altering the modality entirely. If an alerting scent was delivered, the parameters could be adjusted to deliver a stronger intensity or longer duration, the scent could be changed, or the alert could be switched to a visual or audio alert. Then the new adjusted alert modality may be evaluated for effectiveness and reinforced according to the method 500. Therefore, programming 562 an alert modality and parameters may include both new and previously known information. This allows for the alert modality to be adjusted based on feedback obtained from previous executions of the method 500.

Figure 2:
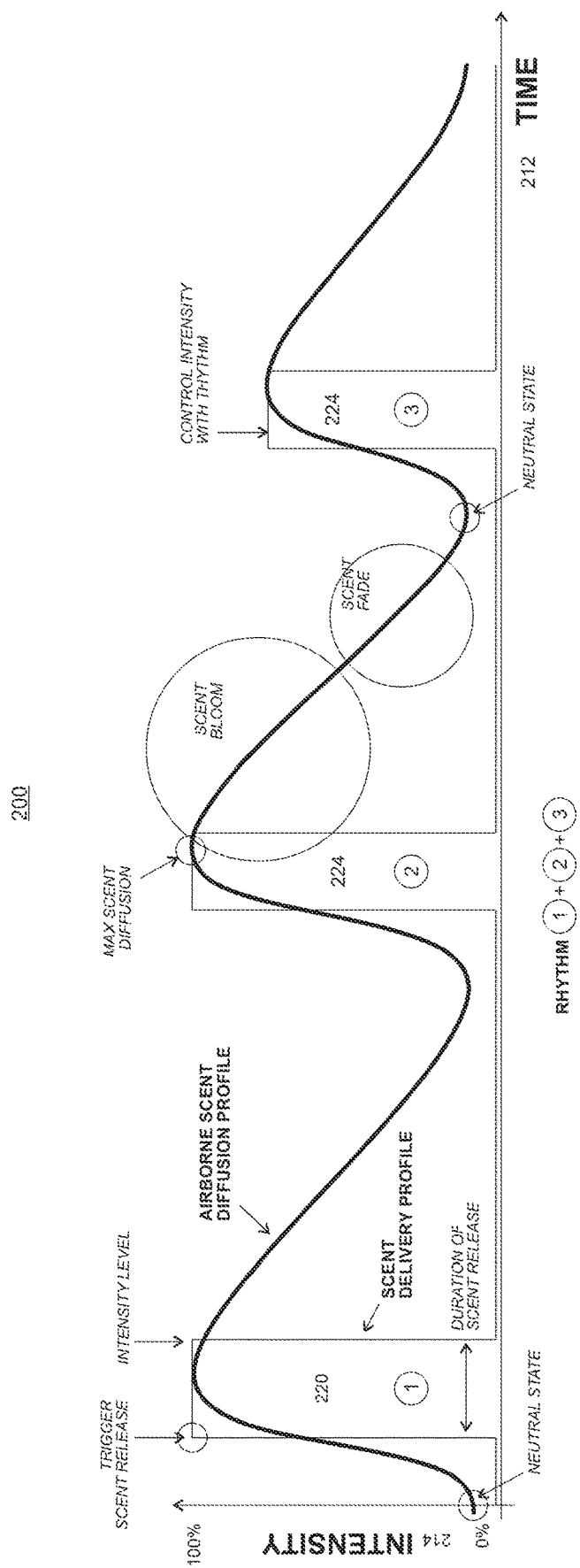
FIG. 2 shows a schematic graph of a dispersed alert scent over time in an embodiment.

FIG. 2 is a schematic graph of the method 200 for delivering an alerting scent over time in an embodiment. The graph in FIG. 2 shows intensity 214 in percent on the ordinate and time 212 on the abscissa. The graph shows delivering a concentration of at least one alerting scent into an atmosphere over time 212. An atmosphere can be any environment, including a cabin of a vehicle or a home, where the scent can be dispersed and might be perceived. The method 200 comprises obtaining information on an environment of the vehicle and determining an alert condition based on the information on the environment of the vehicle. The method continues by delivering the at least one alerting scent to the cabin of the vehicle based on the alert condition. Delivering the alerting scent is done during a delivery period 220. Additional alerts may be executed by increasing a concentration or intensity 214 of the at least one scent medium or another scent medium in the atmosphere during a subsequent delivery period 224. An additional alert may be a repeated delivery of an alerting scent based on a first alert condition or a dispersal of an alerting scent based on a second or new alert condition. The intensity variations shown in FIG. 2, which are between approximately 10% and 95%, are just an example and, in other embodiments, the intensity may vary in other bounds (e.g. 0 and 100%, etc.).

The intensity of scent delivered at any time may be delivered at a certain typical intensity 214 and duration level at delivery periods 220, 224, or it may be varied according to the type of alert event or level of importance or criticality. For example, the scent alert may be delivered for a majority of events at a certain level (e.g. 70% intensity 214 over a typical time period) but for critical events, the intensity 214 is increased to a higher intensity 214 and for a longer duration (e.g. 100% intensity for an increased time duration during a delivery period 220, 224).

Scent dispersing during the time period 222 might not cease but be reduced either mechanically or naturally. Naturally decreasing concentration means allowing the dispersed scent to dilute or diffuse. Diffusion is when molecules of gas, such as a scent, tend to occupy the entire volume available to them. As scent molecules spread out they dilute and eventually decay. This causes their scent to become less perceivable. A scent may still be released during time period 222 at a lesser rate than in the first delivery period 220 in a way that prolongs the decrease of the scent or holds a level of scent concentration in the atmosphere but does not increase the scent. This might be suitable for cases where a scent is diffusing too rapidly, such as in a vehicle with one or more windows open. Or this might be for when a background level of a scent is warranted such as to maintain a scent at a level that a user entering the atmosphere can perceive the alerting scent without waiting for increasing an intensity 214 of the at least one alerting scent during the delivery periods 220, 224. Managing the decrease of the intensity 214 of an alerting scent may also increase the perception of the elapsed time since a delivery period 220, 224. For example, regulating the decrease of scent in a vehicle's cabin that is then refreshed at regular intervals may allow the user to understand at which point a scent alert was delivered based on the remaining intensity 214 of the scent that remaining in the air. Making the diffusion or decay of the scent intensity 214 regular and predictable, even in changing atmospheric conditions that may affect the dissipation of the scent, may increase the reliability of the scent alert and its usefulness as a timekeeping system.

The duration of time period 222 can be controlled to act as a reminder (longer delays between delivery periods 220, 224), act to imply urgency or importance, or reinforce the scent release dependent on the scent type, diffusion characteristics or environmental conditions.

Figure 3:
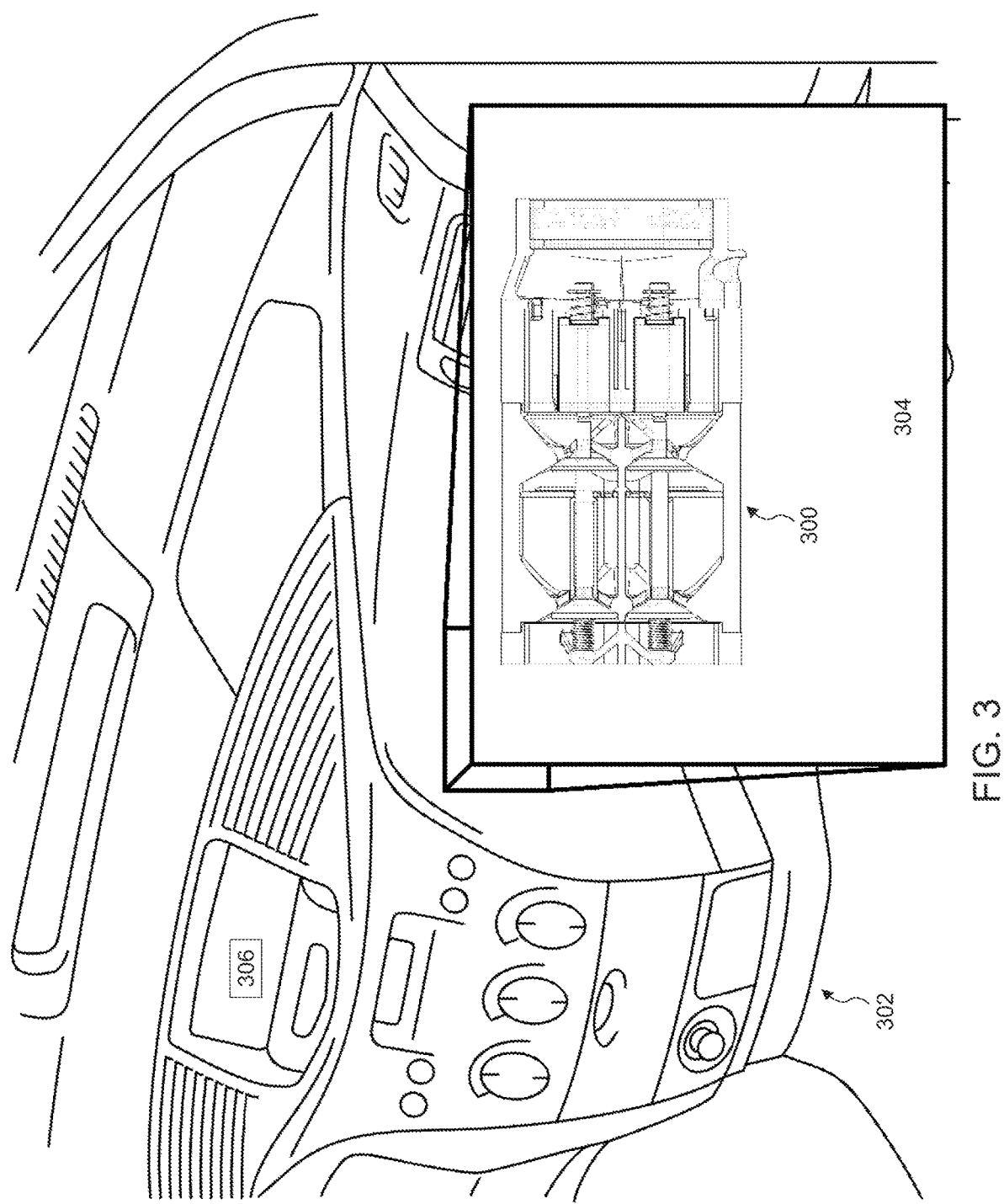
FIG. 3 shows an apparatus configured to deliver an at least one alerting scent to a cabin of a vehicle according to the embodiments described.

FIG. 3 shows an apparatus 300 for delivering an at least one alerting scent to a cabin of a vehicle 302. The apparatus 300 comprises a processor configured to: obtain information on an environment of the vehicle 302, determine an alert condition based on the information on the environment of the vehicle 302, and deliver the at least one alerting scent to the cabin of the vehicle 302 based on the alert condition.

FIG. 3 further shows the apparatus 300 integrated into a vehicle's heating, ventilation, and air conditioning system 304. The apparatus 300 might be integrated with one or more elements of the group of a vehicle operation/status component, navigation/traffic component, an infotainment component, weather information, safety monitoring component, and an autonomous driving system component 306. The apparatus 300 might also be located in a dashboard, glovebox, rear parcel shelf, center console, and front or rear center armrest.

Additionally, the method may be performed by a program stored in a non-transitory machine-readable medium. The program causes a computer to execute a process to deliver an at least one alerting scent to a cabin of a vehicle. The alert scent delivery process comprising: obtaining information on an environment of the vehicle, determining an alert condition based on the information on the environment of the vehicle, and delivering the at least one alerting scent to the cabin of the vehicle based on the alert condition.

Any of the above described embodiments may be combined with any other embodiment (or combination of examples) unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

The aspects and features mentioned and described together with one or more of the previously detailed embodiments and figures, may as well be combined with one or more of the other examples to replace a like feature of the other embodiment or to additionally introduce the feature to the other embodiment.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor, or computer readable and encode machine-executable, processor-executable, or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further embodiments may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples and embodiments recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", may be implemented in the form of dedicated hardware, such as "a signal provider", "a signal processing unit", "a processor", "a controller", as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), FPGA, read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations, or steps, which may, for instance, be substantially represented in computer-readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims might not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples/embodiments a single act, function, process, operation or step may include or may be broken into multiple sub-acts, -functions, -processes, -operations, or -steps, respectively. Such sub acts may be included and part of the disclosure of this single act unless explicitly excluded.

Furthermore, the following claims are hereby incorporated into the detailed description, where each claim may stand on its own as a separate example/embodiment. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for delivering an at least one alerting scent to an at least one user in a cabin of a vehicle, the method comprising:
   obtaining information on an environment of the vehicle and on the at least one user's history,
   wherein the at least one user's history includes a driving behavior of the user in the vehicle;
   determining an alert condition, wherein the determination comprises:
      assessing driving circumstances based on the information on the environment of the vehicle,
      calculating a required level of attention of the at least one user based on the user's history and the driving circumstances,
      evaluating information on a current level of attentiveness of the at least one user, adjudicating whether the information on a current level of attentiveness of the at least one user meets the required level of attention,
triggering the alert condition based on the adjudication of the at least one user's level of attentiveness; and
delivering the at least one alerting scent to the cabin of the vehicle based on the triggered alert condition.

2. The method of claim 1 wherein the information on the environment of the vehicle comprises information on an at least one sign of inattentiveness of the at least one user.

3. The method of claim 2 wherein the at least one sign of inattentiveness comprises at least one element of the group of:
a visual distraction of the at least one user from a road,
a removal of at least one of the user's hands from a control device,
a use of an electronic device by the at least one user,
an alteration of the vehicle's travel path,
a fatigue level of the at least one user, or
a number of users of the vehicle.

4. The method of claim 1 wherein delivering the at least one alerting scent further comprises altering the delivering of the at least one alerting scent based on the information on the level of alertness of the at least one user.

5. The method of claim 4 wherein altering the delivering of the at least one alerting scent comprises at least one element of the group of:
augmenting the at least one alerting scent with an at least one additional scent,
switching to the at least one additional scent,
modifying an intensity of the at least one alerting scent or the at least one additional scent, or
adjusting a climate in the cabin of the vehicle.

6. The method of claim 1 wherein the information on the environment of the vehicle comprises at least one element of the group of: weather, traffic, news, location, or time-based information.

7. The method of claim 1 wherein the alerting scent comprises at least one element of the group of: a citrus, a mint, a rosemary, a coffee, or a eucalyptus scent.

8. The method of claim 1 further comprising delivering an at least one additional alert, wherein the at least one additional alert comprises at least one element of the group of: a physical alert, an auditory alert, or a visual alert.

9. An apparatus for delivering an at least one alerting scent to an at least one user in a cabin of a vehicle, the apparatus comprising:
a processor configured to:
obtain information on an environment of the vehicle and on the at least one user's history, wherein the at least one user's history includes a driving behavior of the user in the vehicle;
determine an alert condition, wherein the determination comprises:
assessing driving circumstances based on the information on the environment of the vehicle,
calculating a required level of attention of the at least one user based on the user's history and the driving circumstances,
evaluating information on a current level of attentiveness of the at least one user, adjudicating whether the information on a level of attentiveness of the at least one user meets the required level of attention,
triggering the alert condition based on the adjudication of the at least one user's level of attentiveness; and
deliver the at least one alerting scent to the cabin of the vehicle based on the triggered alert condition.

10. A non-transitory machine-readable medium storing a program causing a computer to execute a process to deliver an at least one alerting scent to an at least one user in a cabin of a vehicle, the alert scent delivery process comprising:
obtaining information on an environment of the vehicle and on the at least one user's history,
wherein the at least one user's history includes a driving behavior of the user in the vehicle;
determining an alert condition, wherein the determination comprises:
assessing environmental circumstances based on the information on the environment of the vehicle,
calculating a required level of attention of the at least one user based on the user's history and the driving circumstances,
evaluating information on a current level of attentiveness of the at least one user,
adjudicating whether the information on a level of attentiveness of the at least one user meets the required level of attention,
triggering the alert condition based on the adjudication of the at least one user's level of attentiveness; and
delivering the at least one alerting scent to the cabin of the vehicle based on the triggered alert condition.

11. The method of claim 1 wherein the information on the at least one user's history further comprises a user's attributes, including at least one element of the group of the user's:
demographics,
physical attributes,
preferences, or
abilities and training.

12. The method of claim 1 further comprising obtaining feedback from the at least one user.

13. The method of claim 12 wherein the feedback comprises an observed reaction of the at least one user to the alert condition.

14. The method of claim 13 wherein the feedback further comprises information on the environment of the vehicle during the alert condition.

15. The method of claim 12 further comprising adding the feedback to the at least one user's history.

16. The method of claim 1 wherein the information on the driving behavior of the user in the vehicle includes at least one element of the group of the user's:
average speed compared to posted limits,
driving style,
use of turn signals,
experience with specific driving conditions and scenarios,
overall driving performance,
or feedback on previous alert conditions.

* * * * *